(12) United States Patent
Albuz et al.

(10) Patent No.: US 11,423,692 B1
(45) Date of Patent: Aug. 23, 2022

(54) FACIAL IMAGE DATA GENERATION USING PARTIAL FRAME DATA AND LANDMARK DATA

(71) Applicant: META PLATFORMS TECHNOLOGIES, LLC, Menlo Park, CA (US)

(72) Inventors: Elif Albuz, Los Gatos, CA (US); Bryan Michael Anenberg, Mountain View, CA (US); Peihong Guo, San Mateo, CA (US); Ronit Kassis, Sunnyvale, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 65 days.

(21) Appl. No.: 16/663,063

(22) Filed: Oct. 24, 2019

(51) Int. Cl.
| | | |
|---|---|---|
| *G06V 40/16* | (2022.01) | |
| *G06F 17/18* | (2006.01) | |
| *G06N 3/08* | (2006.01) | |

(52) U.S. Cl.
CPC ............ *G06V 40/165* (2022.01); *G06F 17/18* (2013.01); *G06N 3/08* (2013.01); *G06V 40/166* (2022.01)

(58) Field of Classification Search
CPC ........... G06K 9/00248; G06K 9/00255; G06K 9/00268; G06K 9/00288; G06K 9/00335; G06K 9/00221; G06K 9/00302; G06K 9/00362; G06K 9/00201; G06K 9/00281; G06K 9/00315; G06K 9/00711; G06N 3/08; G06N 20/00; G06F 17/18; G06F 3/013; G06F 16/5866; G06F 16/7867; G06F 3/04842; G06F 3/04883; G06F 16/24578; G06F 16/9535; G06F 3/011; G06F 3/017; H04N 7/147; H04N 7/15; H04N 7/142; H04N 5/272; H04N 21/4223; H04N 21/440281; H04N 1/3935; H04N 1/40068; H04N 7/141; H04N 5/23299; H04N 19/136; H04N 21/44008; H04N 21/4728; H04N 21/4788; H04N 7/155; H04N 7/152; H04N 19/107; H04N 21/643; H04N 7/157; H04N 19/40; H04N 21/2187; H04N 21/2343; H04N 21/234363; H04M 3/567; H04M 1/72454; H04M 2250/62; H04M 3/42221; H04M 3/58; G06T 2207/10016; G06T 2200/16; G06T 5/003; G06T 2207/20201; G06T 2207/30201; G06T 7/337; G06T 15/205; G06T 3/0093; G06T 19/006; G06T 17/00; G06T 2207/30196; G06T 19/20;
(Continued)

(56) References Cited

U.S. PATENT DOCUMENTS

| | | | |
|---|---|---|---|
| 2007/0122005 A1* | 5/2007 | Kage ................. | G06K 9/00275 382/115 |
| 2009/0009652 A1* | 1/2009 | Sudo ................ | H04N 5/232945 348/349 |

(Continued)

*Primary Examiner* — Nimesh Patel
(74) *Attorney, Agent, or Firm* — Dorsey & Whitney LLP

(57) ABSTRACT

Examples described herein include systems for reconstructing facial image data from partial frame data and landmark data. Systems for generating the partial frame data and landmark data are described. Neural networks may be used to reconstruct the facial image data and/or generate the partial frame data. In this manner, compression of facial image data may be achieved in some examples.

32 Claims, 7 Drawing Sheets

(58) Field of Classification Search
CPC .......... G06T 2207/10024; G06T 2207/20036; G06V 40/165; G06V 40/166
See application file for complete search history.

(56) References Cited

U.S. PATENT DOCUMENTS

| | | | | |
|---|---|---|---|---|
| 2011/0150280 | A1* | 6/2011 | Tsuji | G06T 7/248 382/103 |
| 2013/0293456 | A1* | 11/2013 | Son | G06F 3/012 345/156 |
| 2014/0016696 | A1* | 1/2014 | Nelson | H04N 19/105 375/240.12 |
| 2018/0343459 | A1* | 11/2018 | Jeon | H04N 19/54 |
| 2020/0358983 | A1* | 11/2020 | Astarabadi | G06V 40/171 |
| 2021/0012558 | A1* | 1/2021 | Li | G06T 15/205 |

\* cited by examiner

FACIAL IMAGE DATA GENERATION USING PARTIAL FRAME DATA AND LANDMARK DATA

FIELD

Examples described herein relate generally to compression techniques. Examples of techniques for compressing facial image data, such as frame data from a video, are described.

BACKGROUND

As video content becomes increasingly prevalent and desirable, storage and bandwidth are increasingly used to store and/or transmit video content. Video compression techniques, such as HEVC, may be used to reduce an amount of data used to represent video. However, existing encoding techniques may utilize complex custom codecs.

SUMMARY

Examples of methods are described herein. An example method includes receiving partial frame data associated with a facial image in a video frame, receiving landmark data corresponding to facial positions of the facial image in the video frame, and utilizing the partial frame data and the landmark data to reconstruct the facial image for the video frame.

Another example method includes generating partial frame data from one or more frames of video including images of a face, tracking changes in landmark data for the face across the one or more frames of video, and transmitting the changes in the landmark data and the partial frame data to a receiving device, wherein the changes in the landmark data and the partial frame data are configured for use in reconstructing one or more representative images of the face corresponding to the images of the face in the one or more frames of video data.

Examples of systems are described herein. An example system includes a processor, and at least one computer readable media encoded with instructions which, when executed, cause the system to perform operations. The operation may include provide partial frame data and landmarks associated with a face in at least one video frame to a trained neural network configured to generate reconstructed image data corresponding to the face from the partial frame data and the landmarks, generate video frame data including the reconstructed image data, and display the video frame data including the reconstructed image data.

DETAILED DESCRIPTION

Certain details are set forth herein to provide an understanding of described embodiments of technology. However, other examples may be practiced without various of these particular details. In some instances, well-known computing devices, computer components, circuits, neural networks, computational techniques, video codec components, and/or software operations have not been shown in detail in order to avoid unnecessarily obscuring the described embodiments. Other embodiments may be utilized, and other changes may be made, without departing from the spirit or scope of the subject matter presented here.

Examples described herein may generally be used to compress data representative of facial images. For example, a facial image may be present in multiple frames of a video. Over the course of multiple frames, the expression of the facial image may change. However, many attributes of the facial image may generally remain the same (e.g., shape, skin tone, distance between various facial anatomic features). Accordingly, examples described herein may compress the data relating to facial images in video frames by providing partial frame data relating to one or more video frames and landmarks for the facial image in the video frames. The video frame may be reconstructed using the partial frame data and the landmarks, rather than transmitting the full pixel information for the video frame. In some examples, a neural network may be used to generate the partial frame data. For example, partial frame data may be generated using multiple frames of video data containing the facial image. In some examples, a neural network may be used to reconstruct the video frame from the partial frame data and the landmarks. For example, a neural network may be trained to reconstruct video frame data using partial frame data and landmarks. In this manner, a reduced amount of data may be needed to represent a facial image across multiple video frames. For example, partial frame data and landmarks may represent the facial image across multiple video frames—rather than using pixel data for every pixel of the facial image in each video frame. The partial frame data and landmark data may be smaller in size than the pixel data for every pixel of the facial image in each video frame. The reduced size may, for example, allow video conference calls to utilize less bandwidth, increasing reliability and availability of video conferencing.

Figure 1:
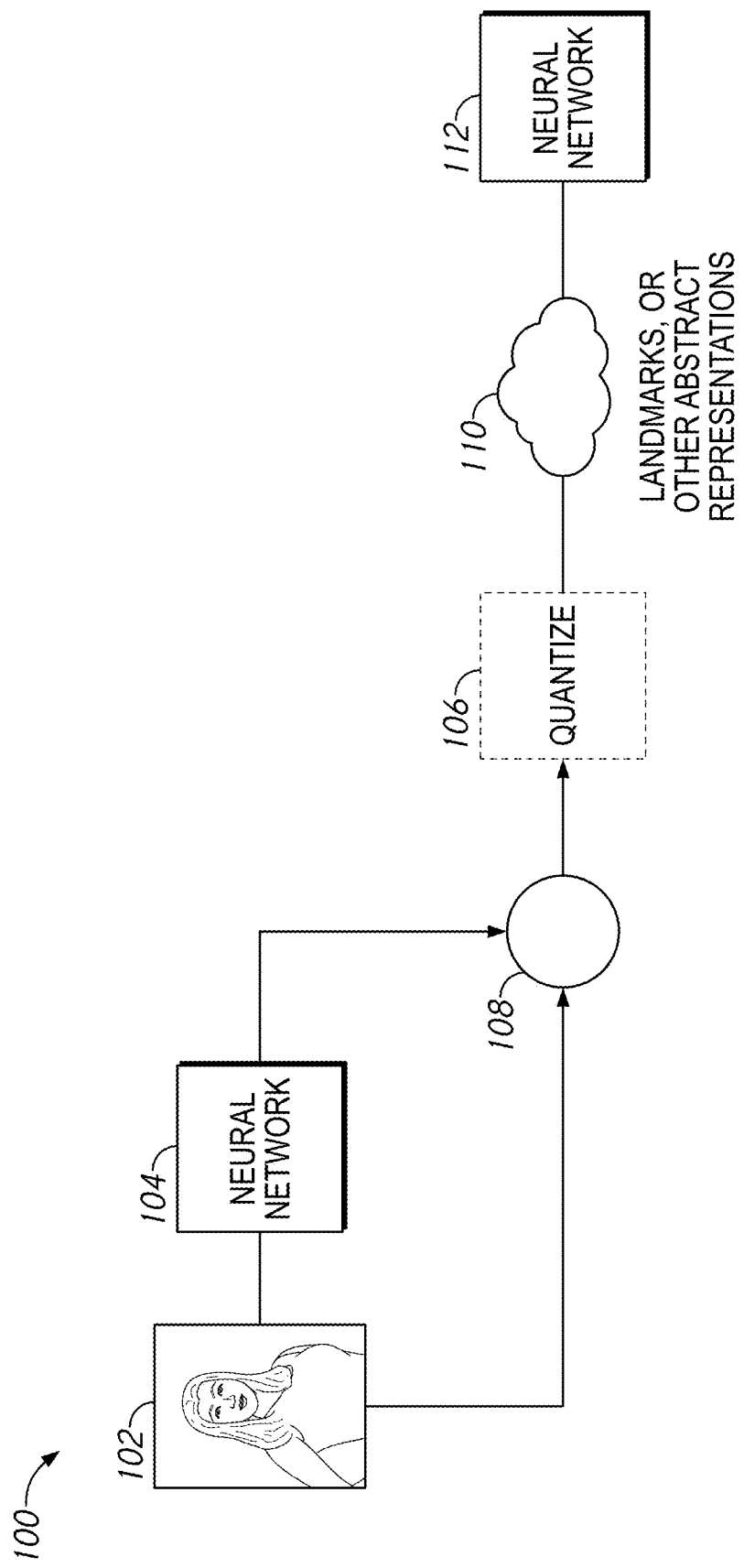
FIG. 1 is a schematic illustration of a system arranged in accordance with examples described herein.

FIG. 1 is a schematic illustration of a system 100 arranged in accordance with examples described herein. The system 100 may include video frame data 102, neural network 104, combiner 108, network 110, and/or neural network 112. Additional, fewer, and/or different components may be used in other examples. The video frame data 102 may be provided to the neural network 104. The neural network 104 may in some examples be used to generate partial frame data from the video frame data 102. Moreover, landmarks may be identified for the video frame data 102. The landmarks and the partial frame data may be combined at the combiner 108. The landmarks and partial frame data may optionally be quantized and/or other processing may occur at quantize 106 before being provided over a network 110 to neural network 112. The neural network 112 may reconstruct facial image frame data using the partial frame data and the landmarks.

Examples of systems described herein may receive video frame data 102. The video frame data 102 may, for example, be included in one or more video files. The video frame data 102 may be one or more frames of videoconference call content. Generally, the video frame data 102 may have any format and/or frame rate. The video frame data 102 may include one or more facial images. Facial images generally refer to an image of a human face or other being including one or more anatomical facial features such as, but not limited to, forehead, eyebrows, eyes, cheekbones, cheeks, nose, mouth, and chin. The video frame data 102 may represent all or a portion of a video, a clip, a broadcast, a videoconference call, or other video content. In some examples, more than one facial image may be present in the video frame data 102. Examples of devices described herein may compress facial image data in video frame data for storage and/or transmission. Examples of receiving devices described herein may reconstruct facial image data from the compressed data. It is to be understood that there may be other data, in addition to facial image data, in the video frame data 102. In some examples, the other data may be compressed in another manner (e.g., using HEVC encoding). Receiving devices may reconstruct the other data using a decoder (e.g., an HEVC decoder) and combine the decoded other frame data with the reconstructed facial image data to form a final video frame in some examples.

Devices described herein may be used to compress facial image data in video frame data, such as video frame data 102, into partial frame data and landmarks. Partial frame data may be compressed data associated with a video frame—e.g., the partial frame data may have less data than the pixel data associated with the video frame. In some examples, the partial frame data may include base facial information. The base facial information may include data representative of a facial image without an expression—e.g., portions of the facial image unrelated to expression (e.g., shape, skin tone, hair tone, distance between various facial anatomic features). The base facial information may generally represent an expressionless or neutral face. The same base facial information may be used to reconstruct multiple frames of video data. For example, multiple frames of video data containing an image of a same face may be reconstructed using a same set of base facial information. In this manner, base facial information may be stored and/or transmitted a single time for multiple video frames, which may further result in additional data compression.

In some examples, the partial frame data (e.g., the base facial information) may be derived from multiple frames of video data. Neural networks described herein, such as neural network 104 of FIG. 1, may be used to generate partial frame data from multiple frames of video data (e.g., video frame data 102). Generally any neural network structure may be used to implement neural network 104, including a deep neural network. The neural network 104 may be trained in some examples to extract partial frame data from multiple frames of video data containing images of a face (e.g., facial image data). For example, the neural network 104 may recognize the face and may extract partial frame data relating to the facial image. In some examples, the neural network 104 may operate on a number of frames of video data (e.g., an initial number of frames in a video) to extract partial frame data. After the partial frame data is generated, in some examples, the neural network 104 may not operate on further frames containing images of the same face in the video. In other examples, the neural network 104 may generate partial frame data periodically (e.g., after a set number of video frames or following a threshold change in the facial image data or after a set amount of time).

Landmarks for facial image data in video frames may be generated. Landmarks generally refer to data relating to expressions of a face in video frame data. For example, points, angles, shapes, or arrangements of anatomical features may be represented by landmarks. Landmarks may be extracted in any of a variety of ways from video frame data 102. In some examples, landmarks are provided for each frame of video frame data 102 having facial image data. In some examples, landmarks are provided periodically for frames of video frame data 102 having facial image data. Generally, landmarks may be provided for more frames than partial frame data. Expressions represented by landmarks may generally be expected to change more frequently than base facial features represented by partial frame data.

In the example of FIG. 1, the landmarks and the partial frame data may be combined by combiner 108 to form compressed data representative of the facial images in the video frame data 102. The combined data may be quantized and/or otherwise processed or further compressed at quantize 106. The processed landmark and partial frame data may be stored and/or transmitted in some examples over a network, such as network 110. The network 110 may generally be any network, such as a wide area network (WAN), a local area network (LAN), a building area network (BAN), or an Internet. The network may be wired or wireless.

Landmarks and partial frame data may be received by a receiving system. Receiving systems described herein may include a neural network, such as neural network 112 of FIG. 1. The neural network 112 may provide reconstructed image data using the landmarks and partial frame data. For example, the neural network 112 may be trained to reconstruct image data for one or more frames of video data using the partial frame data and landmarks received, e.g., through the network 110.

Figure 2:
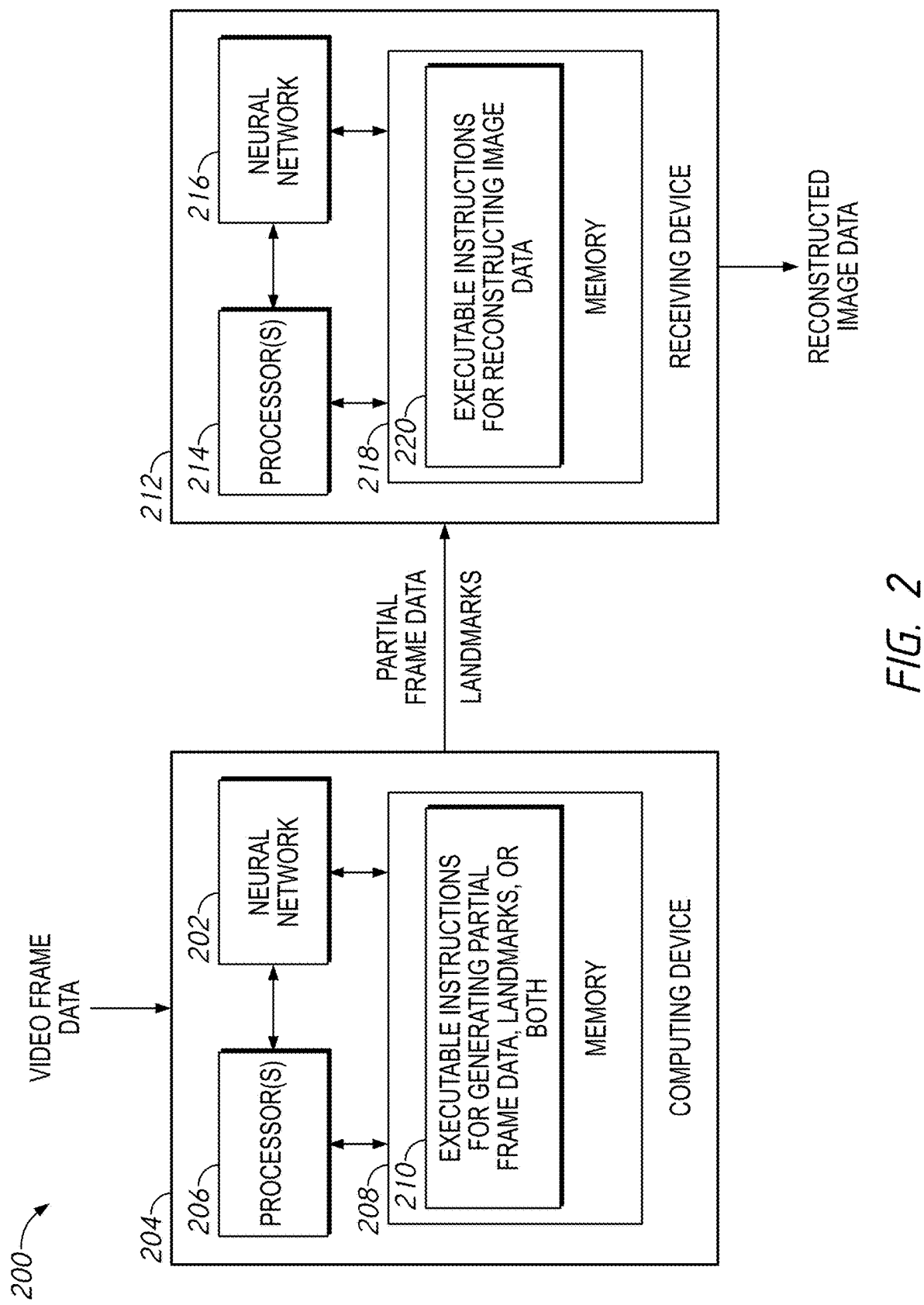
FIG. 2 is a schematic illustration of a system arranged in accordance with examples described herein.

FIG. 2 is a schematic illustration of a system 200 arranged in accordance with examples described herein. The system 200 includes computing device 204 and receiving device 212. The computing device 204 includes processor(s) 206, neural network 202, and memory 208 which may be encoded with executable instructions for generating partial frame data, landmarks, or both 210. The computing device 204 may receive video frame data that may include facial image data. The computing device 204 may generate partial frame data and landmarks for the facial image data. The receiving device 212 may receive the partial frame data and landmarks. The receiving device 212 may include processor(s) 214, neural network 216, and memory 218 which may be encoded with executable instructions for reconstructing image data 220. The receiving device 212 may generate reconstructed image data using the partial frame data and landmarks. The components shown in FIG. 2 are exemplary. Additional, fewer, and/or different components may be used in other examples. The system 200 may be used to implement the system 100 of FIG. 1 in some examples.

Examples of computing devices described herein, such as computing device 204 may be implemented using any of a variety of computing devices including, but not limited to, one or more computers, servers, tablets, cellular phones, smart phones, appliances, automobiles, set-top boxes, or gaming systems.

Examples of computing devices described herein, such as computing device 204 may include one or more processor(s), such as processor(s) 206. Generally, any number and/or kind of processors may be used to implement processor(s) 206 including, but not limited to, one or more processor cores, central processing unit(s), graphical processing unit(s), or other computing circuitry.

Examples of computing devices described herein, such as computing device 204 may include one or more computer readable media, such as memory 208. The memory 208 may be implemented using any of a variety of computer readable media, including read only memory (ROM), random access memory (RAM), solid state drives (SSD), disks, or other storage.

Examples of computing devices described herein, such as computing device 204 may include one or more neural networks, such as neural network 202. The neural network 202 in some examples may be implemented wholly or partially in software (e.g., using executable instructions stored on memory 208 or another computer readable media executed by processor(s) 206). In some examples, the neural network 202 may be implemented wholly or partially in circuitry. The neural network 202 may be used, for example, to implement the neural network 104 of FIG. 1. The neural network 202 may generate partial frame data from facial image data in some examples.

The memory 208 includes executable instructions for generating partial frame data, landmarks, or both 210. The executable instructions for generating partial frame data, landmarks, or both 210 may be executed by processor(s) 206 to generate partial frame data, landmarks, or both, as described herein. The executable instructions for generating partial frame data, landmarks, or both 210 may include instructions for receiving video frame data, identifying facial image data in the video frame data, and generating partial frame data, landmarks, or both, for the facial image data. In some examples the executable instructions for generating partial frame data, landmarks, or both 210 may include instructions for providing facial image data to neural network 202 for generation of partial frame data as described herein. The executable instructions for generating partial frame data, landmarks, or both 210 may include instructions for generating landmark data as described herein.

The partial frame data and landmarks may be provided to (e.g., accessed by) a receiving device, such as receiving device 212 of FIG. 2. In some examples, the partial frame data and landmarks may be transmitted over a network to the receiving device 212. In some examples, the partial frame data and landmarks may be stored (e.g., in a memory or other storage device) and accessed by the receiving device 212.

Examples of receiving devices described herein, such as receiving device 212 may be implemented using any of a variety of computing devices including, but not limited to, one or more computers, servers, tablets, cellular phones, smart phones, appliances, automobiles, set-top boxes, or gaming systems.

Examples of receiving devices described herein, such as receiving device 212 may include one or more processor(s), such as processor(s) 214. Generally, any number and/or kind of processors may be used to implement processor(s) 214 including, but not limited to, one or more processor cores, central processing unit(s), graphical processing unit(s), or other computing circuitry.

Examples of receiving devices described herein, such as receiving device 212 may include one or more computer readable media, such as memory 218. The memory 218 may be implemented using any of a variety of computer readable media, including read only memory (ROM), random access memory (RAM), solid state drives (SSD), disks, or other storage.

Examples of receiving devices described herein, such as receiving device 212 may include one or more neural networks, such as neural network 216. The neural network 216 in some examples may be implemented wholly or partially in software (e.g., using executable instructions stored on memory 218 or another computer readable media executed by processor(s) 214). In some examples, the neural network 216 may be implemented wholly or partially in circuitry. The neural network 216 may be used, for example, to implement the neural network 112 of FIG. 1. The neural network 216 may generate reconstructed image data using the partial frame data and landmarks.

The memory 218 includes executable instructions for reconstructing image data 220. The executable instructions for reconstructing image data 220 may be executed by the processor(s) 214 to cause the receiving device 212 to reconstruct image data from partial frame data and landmarks as described herein. For example, the executable instructions for reconstructing image data 220 may include instructions for receiving (e.g., accessing) the partial frame data and landmark data. The executable instructions for reconstructing image data 220 may include instructions for implementing neural network 216 and/or providing the partial frame data and landmark data to the neural network 216 to generate reconstructed image data based on the partial frame data and the landmarks. The reconstructed image data generally includes pixel data (e.g., RGB values) for the pixels associated with the facial image in the video frames.

Figure 3:
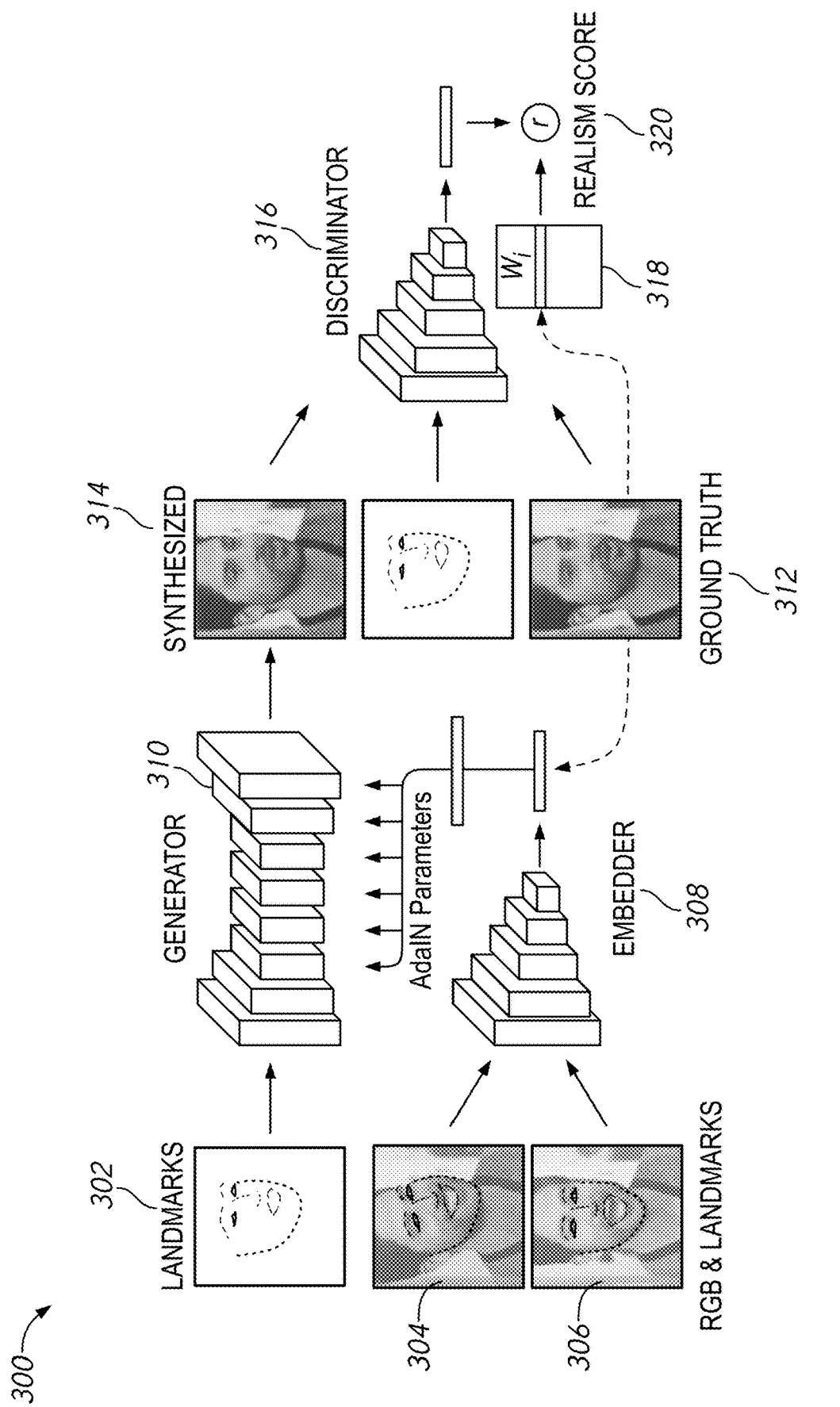
FIG. 3 is a schematic illustration of a system arranged in accordance with examples described herein.

FIG. 3 is a schematic illustration of a system 300 arranged in accordance with examples described herein. The system 300 may include embedder network 308, generator network 310, and/or discriminator network 316. The embedder network 308 may be used to generate partial frame data based on frame data, including frame data 304 and frame data 306. The generator network 310 may be used to generate reconstructed image data 314 using the partial frame data from the embedder network 308 and landmarks 302. The discriminator network 316 may be used during training to select weights 318 which optimize or otherwise meet a criteria for a score 320. The score 320 may be based on a comparison between the reconstructed image data 314, ground truth image data 312, and/or landmarks 302. The weights 318 may be used by the generator network 310 after training in some examples. The components shown in FIG. 3 are exemplary. Additional, fewer, and/or different components may be used in other examples. The embedder network 308 may be used to implement neural networks described herein, such as the neural network 104 of FIG. 1 and/or the neural network 202 of FIG. 2. The generator network 310 may be used to implement neural networks described herein, such as the neural network 112 of FIG. 1 and/or the neural network 216 of FIG. 2.

The system 300 includes embedder network 308 which may generate partial frame data using video frame data, including frame data 304 and frame data 306 in the example of FIG. 3. The partial frame data may include information pertaining to facial images in the frame data which is generic to particular facial expressions (e.g., pose-independent data). The embedder network 308 may accordingly map one or more facial images (e.g., head images) into one or more vectors, which may be referred to as embedding vectors. The frame data input to the embedder network 308 may include one or more frames of video data (e.g., pixel data representing one or more frames). The frame data input to the embedder network 308 may include landmarks and/or estimated landmarks in addition to the pixel data in some examples. Accordingly, the embedder network 308 may provide partial frame data which, in some examples, may be represented by one or more embedding vectors.

The system 300 includes generator network 310 which may generate reconstructed image data 314 using partial frame data from the embedder network 308 and landmarks. The generator network 310 may be implemented, for example, using a set of convolutional layers of a neural network. The generator network 310 may map input landmarks to reconstructed image data through the set of convolutional layers. The convolutional layers may be modulated by the partial frame data (e.g., using the embedding vector(s) generated by the embedder network 308). In some examples, adaptive instance normalization may be used to modulate the convolutional layers and generate the reconstructed image data 314.

Examples of networks, including neural networks, described herein may be trained. Training may occur in some examples prior to operation of a system described herein (e.g., prior to video data being provided to and/or processed into landmarks and partial frame data). In some examples, training may occur wholly or partially during operation of the system. For example, a set of identified frames of video data may be used to train one or more networks to process the remaining frames of video data as described herein.

For example, during training, frames of video data may be passed through embedder network 308 from a same video (e.g., having images of a same face). Multiple sets of frames may be used, and each set of frames may result in embedding vector(s) generated by the embedder network 308. The resulting embedding vector(s) may be averaged or otherwise combined into a final set of embedding vector(s) which may be used during operation by the generator network 310 in processing the same and/or different video frame data from the same and/or different video. The embedding vector(s) may be used to predict adaptive parameters for the generator network 310 in some examples.

During further training, landmarks from a video frame, such as a video frame other than that used to train the generator network 310, may be provided to the embedder network 308. Resulting reconstructed image data 314 may be compared with ground truth image data 312 (e.g., image data from the video frame corresponding to the landmarks). The discriminator network 316 may be used to compare the reconstructed image data 314 and the ground truth image data 312 during training. The discriminator network 316 may be implemented by a neural network and may attempt to discriminate between the reconstructed image data 314 and the ground truth image data 312. A function may be used to evaluate differences between the reconstructed image data 314 and the ground truth image data 312, resulting in a score 320. The function may evaluate both perceptual and adversarial losses in some examples. In some examples, a conditional projection discriminator may be used to implement the discriminator network 316. Various weights 318 may be used by the discriminator network 316 and/or the generator network 310. The score 320 may be used to refine the weights 318 to generate a score 320 meeting a training criteria (e.g., an optimized score).

Figure 4:
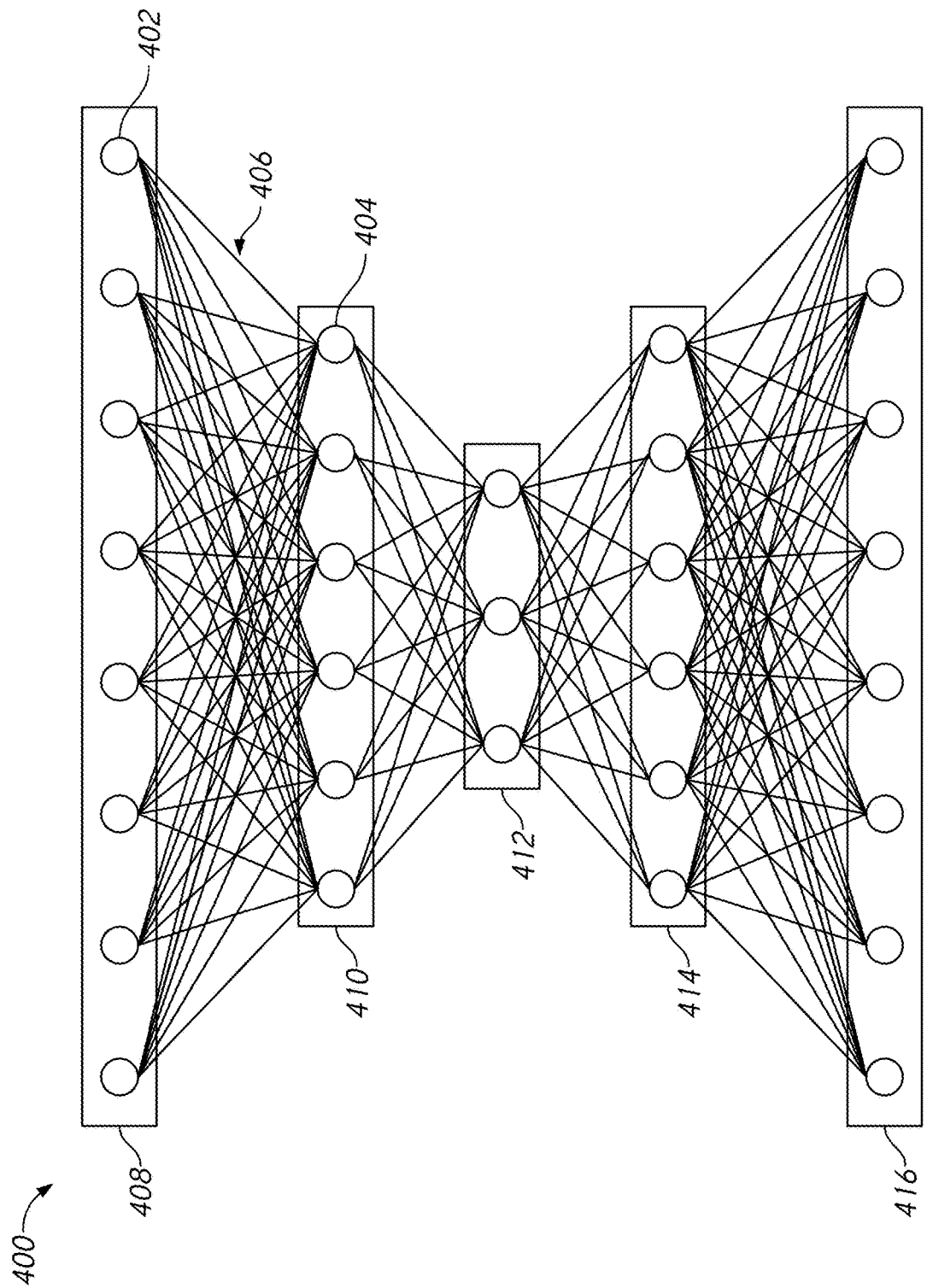
FIG. 4 is a schematic illustration of a neural network in accordance with examples described herein.

Examples described herein may utilize one or more neural networks. FIG. 4 is a schematic illustration of an example neural network 400. The neural network 400 may be used to implement any neural networks described herein, such as neural network 104, neural network 112, neural network 202, neural network 216, embedder network 308, generator network 310, and/or discriminator network 316.

Generally, a neural network may refer to software and/or hardware used to implement a computational model comprising one or more nodes. Example neural network 400 may include input layer 408, intermediate layer 410, intermediate layer 412, intermediate layer 414, and output layer 416. Each layer of neural network 400 may include one or more nodes, such as node 402 and node 404. In some examples, each node of neural network 400 may be connected to another node of the neural network 400, such as by connection 406. As an example and not by way of limitation, each node of input layer 408 may be connected to one of more nodes of intermediate layer 410. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 4 depicts a particular neural network with a particular number of layers, a particular number of nodes, and particular connections between nodes, this disclosure contemplates any suitable neural network with any suitable number of layers, any suitable number of nodes, and any suitable connections between nodes. As an example and not by way of limitation, although FIG. 4 depicts a connection between each node of input layer 408 and each node of intermediate layer 412, one or more nodes of input layer 408 may not be connected to one or more nodes of intermediate layer 412.

In some examples, the neural network 400 may be a convolutional neural network, and the input layer 408 may be a convolutional layer. Convolutional neural networks may also include feedback layer(s), rectified linear unit (RELU) layers, and/or batch normalization layers. One or more of the intermediate layers of neural network 400 may be used to implement these layers in some examples.

Generally, each of the nodes may combine inputs received from connected nodes of other layers using a function, such as an activation function, and/or one or more parameters, such as a weight. The functions and weights may be adjusted (e.g., during training) to impact the performance of the neural network. In some examples, the output layer 416 may evaluate a cost function, which may produce a result (e.g., a score) used to classify the inputs to the neural network and/or map the inputs to a particular output. For example, the neural network may be used to map partial frame data and landmarks to reconstructed image data in accordance with examples described herein.

Figure 5:
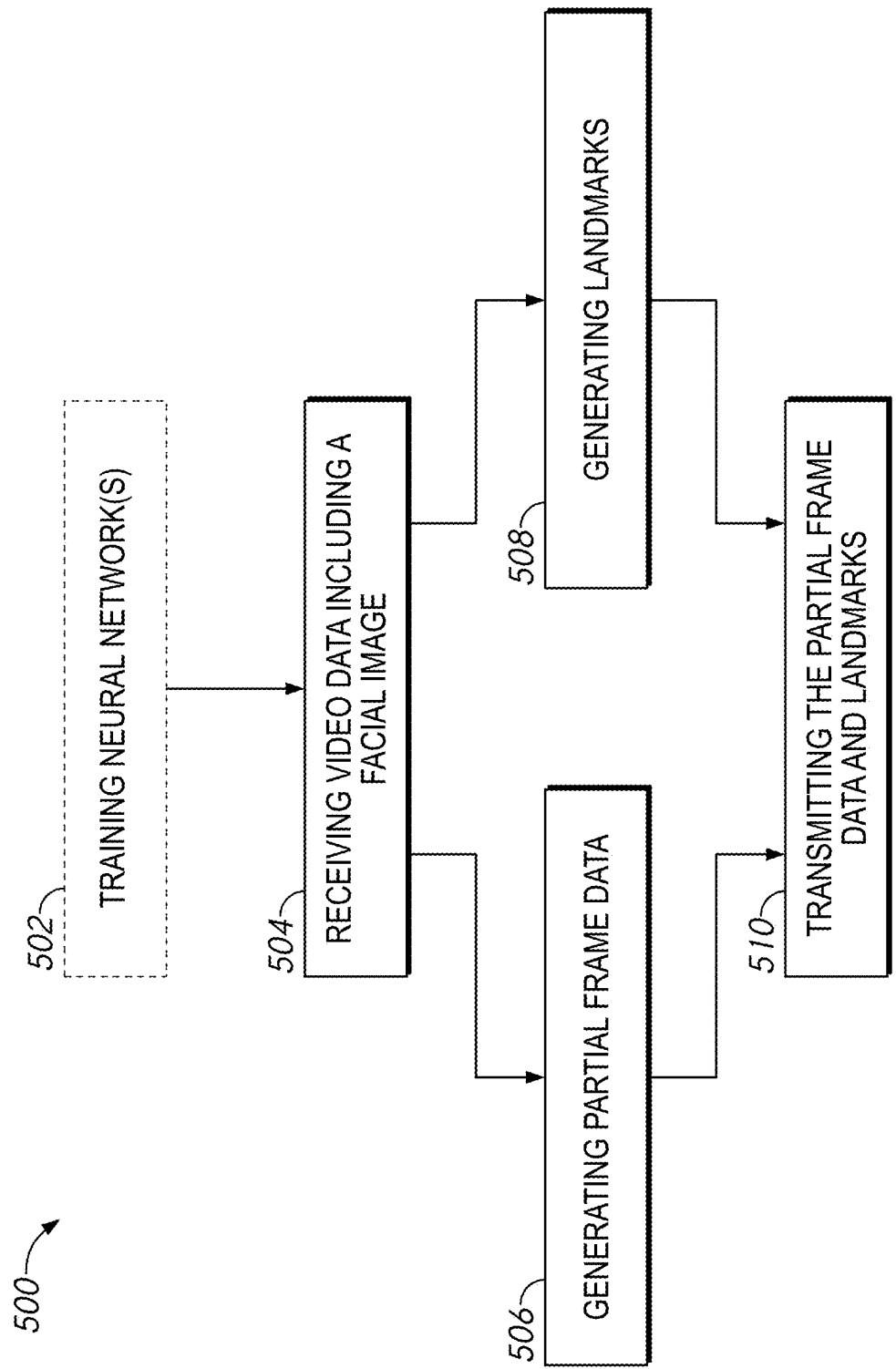
FIG. 5 is a flowchart of a method arranged in accordance with examples described herein.

FIG. 5 is a flowchart of a method arranged in accordance with examples described herein. The method 500 may include block 502 which recites "training neural network(s)". The block 502 may be followed by block 504 which recites "receiving video data including a facial image." The block 504 may be followed by block 506 and/or block 508. Block 506 recites "generating partial frame data" and block 508 recites "generating landmarks." Block 506 and/or block 508 may be followed by block 510 which recites "transmitting the partial frame data and landmarks." The method of FIG. 5 is exemplary only. Additional, fewer, and/or different blocks may be used in other examples, and the blocks may be reordered.

The system 100 may be used to perform method 500 in some examples. The computing device 204 may be used to perform method 500 in some examples. The executable instructions for generating partial frame data, landmarks, or both 210 may include instructions for implementing all or portions of method 500 in some examples.

In block 502, one or more neural networks may be trained. For example, the neural network 104, neural network 112, neural network 202 and/or neural network 216 may be trained. Training may take place using the neural network to be trained in some examples. A different neural network or system may be used to train in some examples. For example, one neural network may be used for training, and neural network parameters or other data identified during training may be stored and used by other neural networks. Training generally refers to a process for determining neural network parameters (e.g., weights) to be used to perform the function of the neural network—such as to generate partial frame data from image data in one or more video frames.

In some examples, a trained neural network may be used to generate partial frame data from multiple videos without re-training. In some examples, however, training may occur more frequently, such as for each video and/or each face contained in a video. In some examples, particular video frames of a video may be used for training, such as an initial number of frames. In some examples, training may not be used.

In block 504, video data may be received which may include one or more facial images. For example, the video may include multiple frames, each frame including an image of a particular face. Any of a variety of video sources may be used, including for example, movies, broadcast television, clips, advertisements, videoconference calls. Accordingly, in some examples, the video may include multiple frames of a user in a conference call. The pose of the face (e.g., expression) may change across multiple frames of the video. For example, as the user is talking or otherwise expressing his or herself, the expression of the face and position of the face may change. Any number of video frames, faces, and/or facial images may be received. The video data may be received by accessing the video data from video storage, and/or receiving the video data over a network or other communications link (e.g., streaming). In some examples, the facial image data may be separated from remaining data in the frame, e.g., background data. Facial image data may be represented as partial frame data and landmarks, which may effectively compress the facial image data for transmission. Remaining data may be compressed using any of a variety of compression techniques (e.g., HEVC encoding).

In block 506, partial frame data may be generated. The partial frame data may refer to base facial information, generally information about the face that may have less variability than features represented by landmarks. Examples of information captured by partial frame data described herein my include face shape, skin color, and/or distance between certain facial features. In some examples, the partial frame data may include color information for pixels representing the face in the images. For example, a base color for the face may be included in the partial frame data—however variation due to facial features represented by landmarks may not be included in partial frame data in some examples. In some examples, the partial frame data may be generated using a neural network (e.g., neural network 202 of FIG. 2) based on several frames of video data containing the facial image. In some examples, the partial frame data may be generated once per video and reutilized for multiple frames. Partial frame data may be generated with other frequencies in other examples.

In block 508, landmarks may be generated. Landmarks may encode pose or expression information for a facial image (e.g., shape, angle, and arrangement of anatomical facial features such as mouth, nose, eyes, or eyebrows). Landmarks may correspond to mapped facial points on the face. In some examples, landmarks may be generated for each frame of video data. In some examples, landmarks may be generated for groups of frames of video data. In some examples, changes in landmark data may be tracked across one or more frames of video. For example, additional landmark data may not be stored and/or transmitted in some examples unless an amount of change in the facial image between video frames exceeds a threshold amount. Changes in landmark data between frames may be tracked (e.g., calculated and/or stored). In some examples, changes in the landmark data may include coordinate changes for the facial points making up the landmarks.

In block 510, the partial frame data and landmarks may be transmitted. In some examples, landmark data may be transmitted in block 510. In some examples, changes in landmark data between frames may be transmitted in block 510. The partial frame data and landmarks may be stored in a memory or other storage device. In some examples, the partial frame data and landmarks may be communicated over a network and/or to another device (such as receiving device 212 of FIG. 2). Accordingly, instead of transmitting and/or storing all pixel data associated with facial images in the video data, partial frame data and landmarks associated with the facial images may be transmitted and/or stored. These techniques may reduce the storage space required to store videos having facial images. These techniques may additionally or instead reduce the network or other communications bandwidth used to transmit and/or receive videos including facial images. In some examples, landmark data (e.g., changes to landmarks) may be transmitted at a frame rate which matches a video stream frame rate of the video data.

Figure 6:
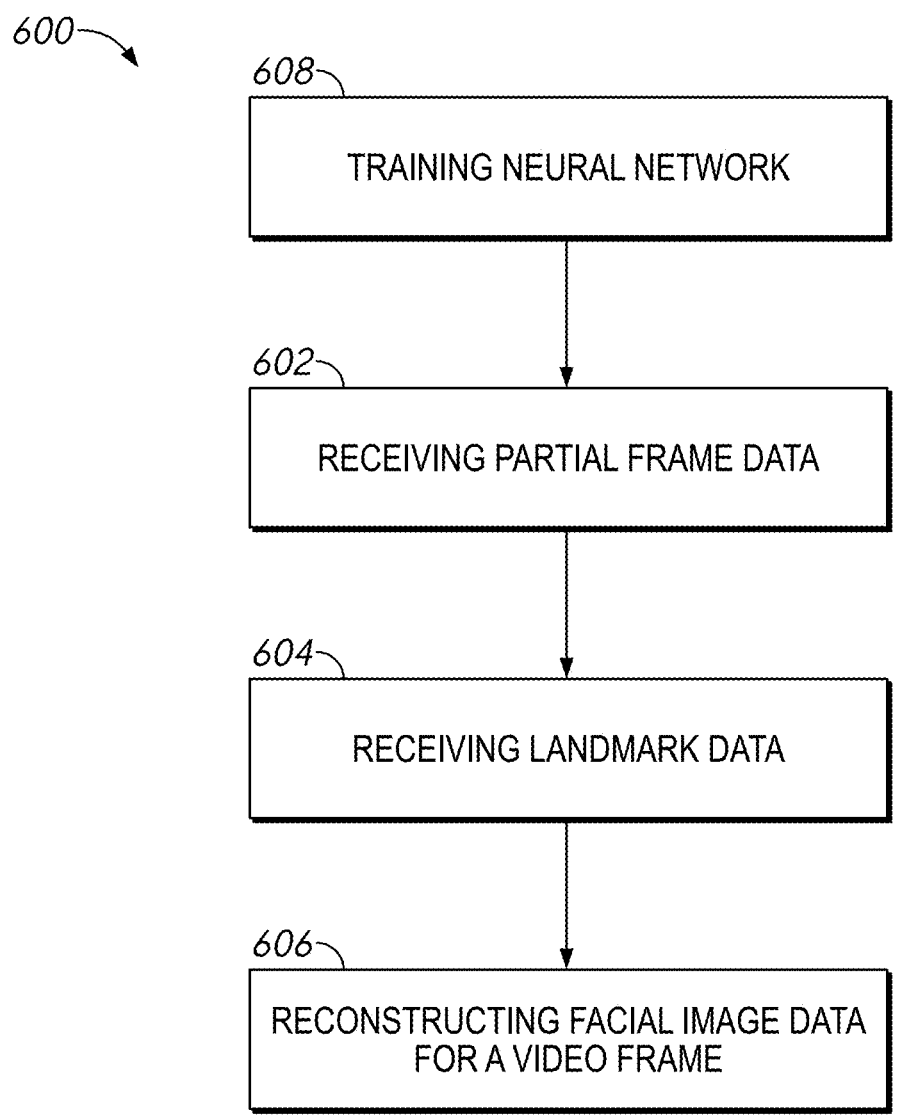
FIG. 6 is a flowchart of a method arranged in accordance with examples described herein.

FIG. 6 is a flowchart of a method arranged in accordance with examples described herein. The method 600 includes block 608 which recites "training a neural network." Block 608 may be followed by block 602 which recites "receiving partial frame data." Block 602 may be followed by block 604 which recites "receiving landmark data." Block 604 may be followed by block 606 which recites "reconstructing facial image data for a video frame." The blocks shown in FIG. 6 are exemplary. Additional, fewer, and/or different blocks may be used in other examples. The blocks may be differently ordered in some examples. The method 600 may be performed by systems described herein, such as by receiving device 212 of FIG. 2. The executable instructions for reconstructing image data 220 in FIG. 2 may include instructions for implementing the method 600 of FIG. 6.

In block 608, one or more neural networks may be trained. For example, the neural network 112 and/or neural network 216 may be trained. Training may take place using the neural network to be trained in some examples. A different neural network or system may be used to train in some examples. For example, one neural network may be used for training, and neural network parameters or other data identified during training may be stored and used by other neural networks. Training generally refers to a process for determining neural network parameters (e.g., weights) to be used to perform the function of the neural network—such as to reconstruct facial image data for a video frame from partial frame data and landmarks. Training of the neural network may occur in some examples once per video, but may be less frequent in other examples. In some examples, per-video training may not be used, and a trained neural network may be provided for reconstruction of facial image data over multiple different videos and/or facial images.

Block 602 recites "receiving partial frame data." For example, the receiving device 212 of FIG. 2 may receive partial frame data from the computing device 204 of FIG. 2. The partial frame data may be received, for example, over a communication link and/or by being retrieved from storage. The partial frame data may refer to pose-independent facial information. In some examples, the partial frame data may include a vector representation of a facial image. The partial frame data may be associated with a facial image in a video frame. The partial frame data may be compressed relative to the complete pixel data associated with the facial image in a video frame to be constructed. For example, the partial frame data may be smaller in size than the complete pixel data associated with the facial image to be reconstructed. In some examples, the partial frame data may include base facial information derived from multiple frames of video content including a face corresponding to the facial image in a video frame.

In some examples, block 602 may additionally or instead include receiving difference partial frame data corresponding to a difference between facial image data in multiple video frames (e.g., consecutive video frames). A difference between facial image data across video frames corresponding to the same face may be determined, for example by computing device 204 of FIG. 2. Partial frame data corresponding to this difference may be sent by computing device 204 and received by receiving device 212 in some examples. In this manner, if the partial frame data for use in reconstructing facial image data changes, a complete set of partial frame data may not be transmitted or stored in some examples. Instead, data corresponding to a difference between the updated partial frame data and the previous partial frame data may be transmitted and/or stored. In this manner, further compression, storage efficiency, and/or bandwidth reduction may be achieved in some examples.

In some examples, satisfactory reconstruction of the facial image may not be performed using the partial frame data alone, since in some instances the partial frame data may not contain information regarding an expression of the facial image in any particular video frame. The partial frame data may be received in block 608 at a frequency which is less than a video frame rate of a video to be reconstructed. In some examples, partial frame data may be received once and used to reconstruct facial images in multiple video frames—e.g., once for an entire video, an entire video segment, or once for images of a particular face which may appear in one or more videos and/or video frames. The partial frame data may be stored, for example in memory accessible to receiving device 212 of FIG. 2.

Block 604 recites "receiving landmark data." For example, the receiving device 212 of FIG. 2 may receive landmark data from the computing device 204 of FIG. 2. The landmark data may be received, for example, over a communication link and/or by being retrieved from storage. Although block 604 is shown after block 602 in FIG. 6, the landmark data may be received wholly or partially at a same time as receipt of partial frame data. In some examples, landmark data may be received more frequently than partial frame data (e.g. at a frame rate of video data or closer to a frame rate than a frequency of receipt of partial frame data). The landmark data received in block 604 may correspond to facial positions of a facial image in a video frame. The landmark data may be stored, for example, in memory accessible to receiving device 212 of FIG. 2.

In some examples, block 604 may additionally instead include receiving difference landmark data. The difference landmark data may correspond to a difference between landmark data associated with a facial image in multiple video frames, e.g., a delta between first and second landmark data. The difference landmark data may generated, for example by computing device 204 of FIG. 2 and received by receiving device 212 of FIG. 2. The difference landmark data may be transmitted and/or stored at a frame rate of a video in some examples. In this manner, rather than transmitting and/or storing complete landmark data for a particular video frame, only data pertaining to a difference between landmark data for a frame and landmark data from a previous frame may be stored and/or transmitted. In this manner, further compression, storage efficiency, and/or bandwidth reduction may be achieved in some examples.

Block 606 recites "reconstructing facial image data for a video frame." For example, the receiving device 212 of FIG. 2 may reconstruct the facial image data. A trained neural network may be used to reconstruct the facial image data in some examples, such as the neural network 216 of FIG. 2. The facial image data may be reconstructed utilizing the partial frame data and the landmark data received during method 600. In some examples, a neural network may be used to reconstruct the facial image data. The reconstructed facial image data may include pixel data (e.g., RGB values) for each pixel corresponding to a facial image to be displayed. The reconstructed facial image data may represent a facial image having an expression. The reconstructed facial image data may have some losses relative to the initial video frame, however, the reconstructed facial image data may be satisfactory for viewing.

In some examples, block 606 may include utilizing difference partial frame data and/or difference landmark data to reconstruct the facial image data for subsequent video frames. For example, difference partial frame data and/or difference landmark data may be combined with partial frame data and/or landmark data from one or more previous frames, and the combined data used to reconstruct facial image data.

The reconstructed facial image data may be stored (e.g., in a memory accessible to receiving device 212 of FIG. 2), displayed (e.g., on a display of receiving device 212), combined with other video data, or otherwise utilized. In some examples, the reconstructed facial image data may be displayed to a user—e.g., during a videoconference call or other video application. In some examples, the facial image data may be displayed against a predetermined background (e.g., a solid background). For example, facial image data may be displayed against a predetermined background during a conference call, such as a user-to-user conference call, which may further reduce data to be transmitted and/or stored as part of the conference call. In some examples, the facial image data may be combined with other frame data (e.g., decoded frame data) that may include other aspects of a scene or environment for the facial image.

Figure 7:
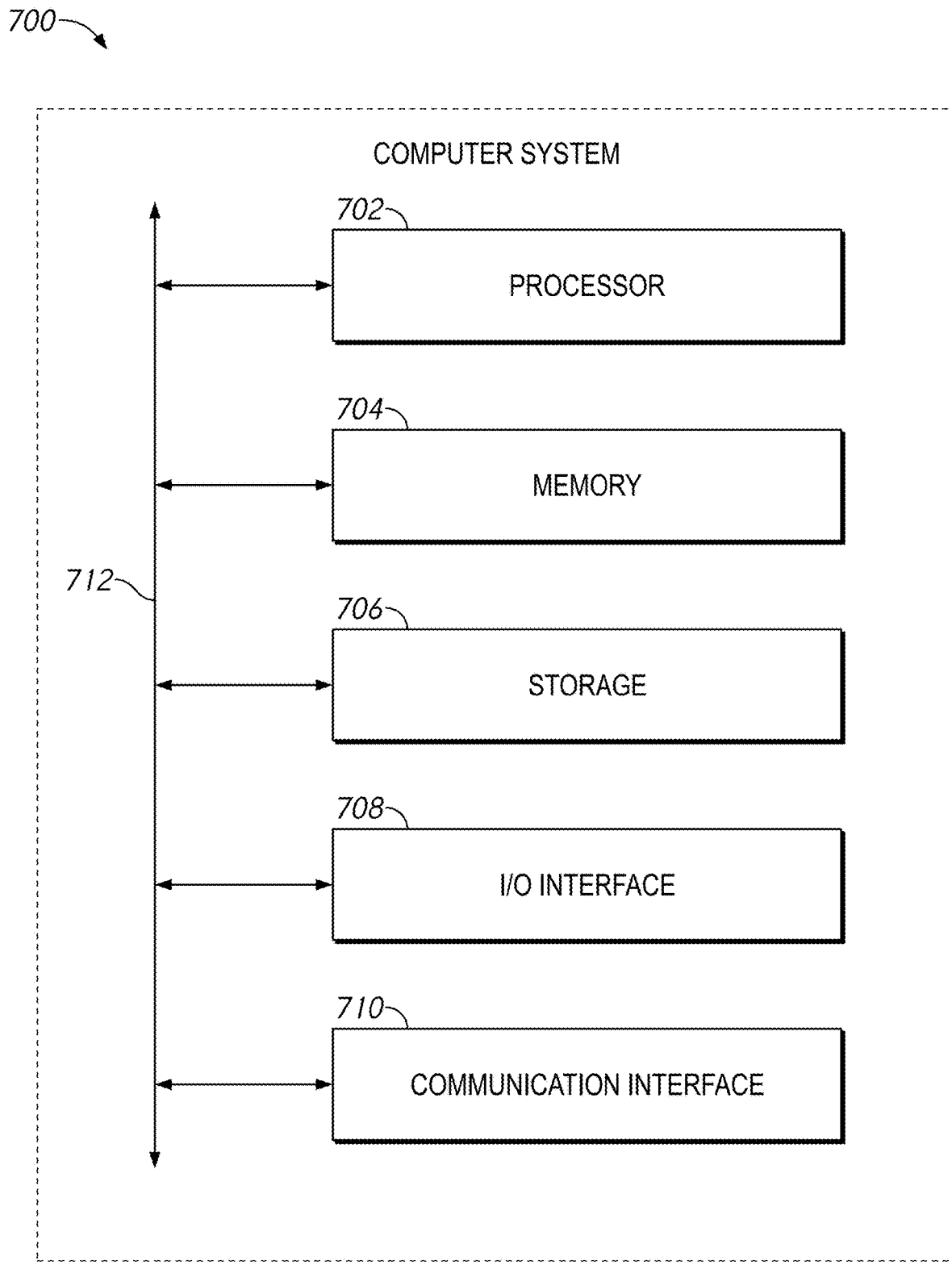
FIG. 7 illustrates a computer system in accordance with one embodiment.

FIG. 7 illustrates a simplified block diagram of one or more computing devices that may be used to implement systems described herein. The computer system 700 may be used to implement, for example, the computing device 204 and/or receiving device 212 of FIG. 2. In particular embodiments, one or more computer systems perform one or more blocks of one or more methods described or illustrated herein, such as method 500 and/or method 600. Software running on one or more computer systems may perform one or more steps of one or more methods described or illustrated herein or provides functionality described or illustrated herein. Particular embodiments include one or more portions of one or more computer systems. Reference to a computer system may encompass a computing device, and vice versa, where appropriate. Moreover, reference to a computer system may encompass one or more computer systems, where appropriate.

The computer system 700 can take various physical forms. As example, computer system 700 may be an embedded computer system, a system-on-chip (SOC), a single-board computer system (SBC)(such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems; be unitary or distributed; span multiple locations; span multiple machines; span multiple data centers; or reside in a cloud, which may include one or more cloud components in one or more networks. One or more computer systems may perform without substantial spatial or temporal limitation one or more steps of one or more methods described or illustrated herein, such as method 500 and/or method 600. As an example, one or more computer systems may perform in real time or in batch mode one or more steps of one or more methods described or illustrated herein. One or more computer systems may perform at different times or at different locations one or more steps of one or more methods described or illustrated herein, where appropriate.

The computer system 700 may include one or more of the following components: processor 702, memory 704, storage 706, an I/O interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

The processor 702 includes hardware for executing instructions, such as those making up a computer program. As an example, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, memory 704 may include one or more internal caches for data, instructions, or addresses. Processor 702 may include any suitable number of any suitable internal caches, where appropriate. As an example, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors. Although this disclosure describes and illustrates a particular processor, this disclosure contemplates any suitable processor.

The memory 704 includes main memory for storing instructions for processor 702 to execute or data for processor 702 to operate on. As an example and not by way of limitation, computer system 700 may load instructions from storage 706 or another source (such as, for example, another computer system) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories, where appropriate. Although this disclosure describes and illustrates particular memory, this disclosure contemplates any suitable memory.

Storage 706 includes mass storage for data or instructions. As an example and not by way of limitation, storage 706 may include a hard disk drive (HDD), a floppy disk drive, flash memory, a solid state drive (SSD), an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages. Although this disclosure describes and illustrates particular storage, this disclosure contemplates any suitable storage.

The input/output (I/O) interface 708 includes hardware, software, or both, providing one or more interfaces for communication between computer system 300 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, display, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interface 708 for them. Where appropriate, I/O interface 708 may include one or more device or software drivers enabling processor 702 to drive one or more of these I/O devices. I/O interface 708 may include one or more I/O interface 708, where appropriate. Although this disclosure describes and illustrates a particular I/O interface, this disclosure contemplates any suitable I/O interface.

The communication interface 710 includes hardware, software, or both providing one or more interfaces for communication (such as, for example, packet-based communication) between computer system 700 and one or more other computer systems or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global system for Mobile Communications (GSM) network), or other suitable wireless network or a combination of two or more of these. Computer system 700 may include any suitable communication interface 710 for any of these networks, where appropriate. Communication interface 710 may include one or more communication interfaces, where appropriate. Although this disclosure describes and illustrates a particular communication interface, this disclosure contemplates any suitable communication interface.

The bus 712 includes hardware, software, or both to couple components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses, where appropriate. Although this disclosure describes and illustrates a particular bus, this disclosure contemplates any suitable bus or interconnect.

A computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
receiving partial frame data including base facial information representative of a facial image unrelated to expressions in a video frame;
receiving landmark data corresponding to facial positions of the facial image in the video frame, the facial positions configured to change across one or more frames based on expressions;
reconstructing the facial image for the video frame including combining the base facial information and the landmark data; and
storing the reconstructed facial image in a memory;
receiving difference partial frame data corresponding to a difference between the video frame and a second video frame including a second facial image associated with a same face as the facial image;
receiving difference landmark data corresponding to a difference between second landmark data associated with the second facial image and the landmark data; and
utilizing the difference partial frame data and the difference landmark data to reconstruct the second facial image for the second video frame; and
storing the reconstructed second facial image in the memory.

2. The method of claim 1, wherein the partial frame data comprises compressed data associated with the video frame.

3. The method of claim 1, wherein the partial frame data comprises the base facial information derived from multiple frames of video content including a face corresponding to the facial image in the video frame.

4. The method of claim 3, further comprising:
receiving the base facial information a single time; and
utilizing the base facial information to reconstruct a second facial image in a second video frame, the second facial image associated with a same face as the facial image.

5. The method of claim 4, further comprising receiving difference partial frame data corresponding to a difference between the video frame and the second video frame.

6. The method of claim 4, further comprising receiving difference landmark data corresponding to a difference between second landmark data associated with the second facial image and the landmark data.

7. The method of claim 1, wherein utilizing the partial frame data and the landmark data to reconstruct the facial image comprises utilizing a trained neural network to reconstruct the facial image for the video frame.

8. The method of claim 1, wherein the partial frame data comprises a vector representation of the facial image.

9. The method of claim 1, wherein the video frame comprises a frame of conference call content.

10. The method of claim 1, wherein the partial frame data is smaller in size than pixel data associated with the video frame.

11. The method of claim 10, wherein the partial frame data is smaller in size than pixel data associated with the facial image in the video frame.

12. A method comprising:
generating partial frame data including base facial information representative of a facial image from one or more frames of video including images of a face, the base facial image being unrelated to expressions, the one or more frames of video including a first video frame including the facial image;
tracking changes in partial frame data to generate difference partial frame data corresponding to a difference between the first video frame and a second video frame including a second facial image associated with a same face as the facial image;
tracking changes in landmark data corresponding to facial positions of the facial image in the video frame for the face across the one or more frames of video to generate difference landmark data corresponding to a difference between second landmark data associated with the second facial image and the landmark data, the facial positions configured to change across one or more frames based on expressions;
transmitting the difference landmark data and the difference partial frame data to a receiving device,
reconstructing one or more representative images of the face corresponding to the images of the face in the one or more frames of video data including combining the base facial information and the landmark data, the one or more representative images including the facial image;
utilizing the difference partial frame data and the difference landmark data to reconstruct the second facial image; and
storing the reconstructed facial image and the reconstructed second facial image in a memory.

13. The method of claim 12, wherein the landmarks correspond to mapped facial points on the face and the changes in the landmark data include coordinate changes for the facial points.

14. The method of claim 12, wherein the partial frame data includes color information for pixels representing the face in the images.

15. The method of claim 12, wherein the one or more frames of video comprise frames of a user in a conference call.

16. The method of claim 12, wherein generating the partial frame data comprises utilizing a deep neural network configured to recognize the face.

17. The method of claim 12, wherein the changes in the landmark data are transmitted at a frame rate matching a video stream frame rate of the video data.

18. The method of claim 12, further comprising deriving the base facial information from multiple video frames including the face.

19. The method of claim 18, wherein the deriving the base facial information from multiple video frames including the face is performed by a neural network.

20. The method of claim 12, wherein the partial frame data is smaller in size than pixel data associated with the video frame.

21. The method of claim 20, wherein the partial frame data is smaller in size than pixel data associated with the facial image in the video frame.

22. The method of claim 12, further comprising:
deriving the base facial information from multiple frames of video content including the face; and
transmitting the base facial information a single time.

23. A system comprising:
a processor; and
at least one computer readable media encoded with instructions which, when executed, cause the system to perform operations comprising:
provide partial frame data including base facial information representative of a facial image unrelated to expressions and landmarks corresponding to facial positions of the facial image configured to change across one or more frames based on expressions in at least one video frame to a trained neural network configured to generate reconstructed image data corresponding to the face by combining the base facial information and the landmarks;
generate video frame data including the reconstructed image data;
display the video frame data including the reconstructed image data provide difference partial frame data corresponding to a difference between the at least one video frame and another video frame including a second facial image associated with a same face as the facial image;
provide difference landmark data corresponding to a difference between second landmark data associated with the another video frame and the landmark data of the at least one video frame; and
generate the another video frame data including second image data reconstructed by the trained neural network using the difference partial frame data and the difference landmark data, the second image data including a second facial image for the another video frame; and
display the another video frame data including the reconstructed second image data.

24. The system of claim 23, wherein the partial frame data comprises a vector representation of the face.

25. The system of claim 23, wherein the base facial information is derived from multiple video frames including the face.

26. The system of claim 23, wherein the at least one video frame comprises a frame of a videoconference call.

27. The system of claim 23, wherein the video frame comprises an image of the face against a predetermined background.

28. The system of claim 23, wherein the operations further comprise:
   receive difference landmark data associated with the face in subsequent video frames;
   reconstruct subsequent images of the face using the difference landmark data; and
   display the subsequent images of the face.

29. The system of claim 23, wherein the partial frame data comprises compressed data for the at least one video frame.

30. The system of claim 23, wherein the partial frame data is smaller in size than pixel data associated with the video frame.

31. The system of claim 30, wherein the partial frame data is smaller in size than pixel data associated with the facial image in the video frame.

32. The system of claim 23, wherein the operations further comprising:
   derive the base facial information from multiple frames of video content including the face; and
   transmit the base facial information a single time.

\* \* \* \* \*